(12) United States Patent
Ahn

(10) Patent No.: US 6,335,393 B1
(45) Date of Patent: Jan. 1, 2002

(54) PRECURSOR COMPOSITION FOR METAL OXIDE AND PREPARATION METHOD THEREFOR

(75) Inventor: Sung-il Ahn, Suwon (KR)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 09/247,516

(22) Filed: Feb. 10, 1999

(30) Foreign Application Priority Data

Feb. 12, 1998 (KR) .............................................. 98-4177
Jan. 14, 1999 (KR) ................................................ 99-841

(51) Int. Cl.$^7$ ................................................ C08K 3/00
(52) U.S. Cl. ................... 524/401; 524/427; 252/182.29
(58) Field of Search ................................ 524/401, 427; 252/182.29

(56) References Cited

U.S. PATENT DOCUMENTS 5,168,024 A * 12/1992 Yamamoto et al. ........... 430/58

* cited by examiner

Primary Examiner—Edward J. Cain
(74) Attorney, Agent, or Firm—Burns, Doane, Swecker & Mathis L.L.P.

(57) ABSTRACT

A precursor composition for a metal oxide, and a preparation method therefor. The precursor composition contains metal alkoxide and aromatic hydrocarbon. The precursor composition for a metal oxide exhibits excellent stability to heat and moisture in air, and is easily mixed with various organic solvents and binders, and easily formulated in paste form. Also, various metals are evenly mixed in the paste, so the precursor composition is very useful in forming a composite metal oxide film. In the case where the composite metal oxide film is used as a protective film for a plasma display device, the composite metal oxide film can easily generate secondary electrons even at a low discharging voltage. Thus, the driving voltage of the plasma display device can be lowered. In addition, the precursor composition for a metal oxide can be used as an inorganic binder or for preparing a catalyst.

22 Claims, No Drawings

PRECURSOR COMPOSITION FOR METAL OXIDE AND PREPARATION METHOD THEREFOR

This application claims priority under 35 U.S.C. §§ 119 and/or 365 to Korean Patent Applications No. 98-4177 filed on Feb. 12, 1998 and No. 99-841 filed on Jan. 14, 1999; the entire content of which is hereby incorporated by reference.

BACKGROUND OF THE INVENTION

1. Field of the Invention

The present invention relates to a precursor composition for a metal oxide and a preparation method therefor, and more particularly, to a precursor composition for a metal oxide, which is thermally stable and easy to store due to its low reactivity to moisture in the air, and a preparation method therefor.

2. Description of the Related Art

A plasma display device is for displaying an image using a gas discharge phenomenon. Since the plasma display device has excellent luminance, contrast, and viewing angle properties, the plasma display device has been touted as a display device capable of replacing the CRT. In the plasma display device, gas discharges occur in gaps between electrodes when a voltage applied to the electrodes, and a phosphor is excited by the accompanying ultraviolet ray emissions, thereby emitting light.

The plasma display device is classified into an alternative (AC) type and a direct current (DC) type according to the discharge mechanism. The structure of a conventional AC type plasma display device is described as follows.

First electrodes as a transparent display electrode, and second electrodes as an address electrode are formed between a first substrate and a second substrate . Here, a plurality of first electrodes and a plurality of second electrodes are formed in strips on the inner surfaces of the first substrate and the second substrate at right angles.

A dielectric film and a protective film are formed in sequence on the first substrate having the first electrodes. Also, a dielectric film is formed on the second substrate having the second electrodes, and a plurality of barrier walls are formed on the dielectric film. A plurality of cells are formed by the barrier walls, and the cells are filled with an inert gas such as argon (Ar). Also, a phosphor layer is formed at a predetermined area of the cells.

In the above-described plasma display device, the protective film is formed by an E-beam, sputtering or spin-coating method. In the case where the protective film is formed by the E-beam or sputtering method, the manufacturing process itself is complicated and expensive equipment is used, so that manufacturing costs increases and much time is consumed. Thus, it make difficult to produce a cheap plasma display device.

Next, a step of forming a protective film by the spin-coating method will be described.

As a major component of a composition for forming a protective film, nano-sized alkaline earth metal oxide particles or an organometallic compound is used. Here, the alkaline earth metal oxide particles are obtained from alkaline earth metal alkoxide by a sol-gel process. Such alkaline earth metals are easily generated to secondary electron through collision of ions or electrons.

After preparing a composition for a protective film by adding a solvent to nano-sized alkaline earth metal oxide particles or an organometallic compound, the obtained composition is spin-coated on a dielectric film and dried, thereby completing a protective film.

However, the above-described spin-coating method has the following problems.

First, metal oxide particles contained in the composition for a protective film conglomerate with the passing of time, so characteristics of the composition are liable to change. Accordingly, stability during storage of the composition is poor.

Second, it is difficult to prepare the metal oxide particles or organic metal compound, and manufacturing costs are high. Also, when preparing the metal oxide particles by a sol-gel process, it is difficult to obtain the particle having narrow particles diameter distribution range.

Third, the obtained protective film has poor film quality and physical properties, such as transmittance, that are not satisfactory.

SUMMARY OF THE INVENTION

To solve the above problems, it is an objective of the present invention to provide a precursor composition for a metal oxide, which is thermally stable and has stability in storage due to its low reactivity to moisture in the air.

It is another objective of the present invention to provide a method for preparing the precursor composition for a metal oxide.

DESCRIPTION OF THE PREFERRED EMBODIMENTS

To achieve the first objective of the present invention, there is provided a precursor composition for a metal oxide, comprising metal alkoxide and aromatic hydrocarbon.

Preferably, the aromatic hydrocarbon is naphthalene, stilbene or trimethylbenzene.

Preferably, the composition further comprises a binder, and the binder is polyethylcellulose or polyvinylacetate.

To achieve the second objective of the present invention, there is provided a method for preparing a precursor composition for a metal oxide, comprising the steps of:

(a) dissolving aromatic hydrocarbon in a first solvent and adding metal alkoxide to the solution;

(b) adding a second solvent to the mixture of the step (a); and (c) removing the first solvent from the mixture of the steo (b) and adding water to the mixture.

Metal alkoxide, preferably, alkaline earth metal alkoxide, reacts with moisture in the air or in solvent to form precipitate as a metal hydrate, and the metal alkoxide is very unstable to heat. Thus, the metal alkoxide is easily decomposed by heat. The present invention is characterized in that aromatic hydrocarbon is added to and mixed with the metal alkoxide, so that stability to heat or moisture of the metal alkoxide is improved by interaction between aromatic hydrocarbon and metal alkoxide.

Preferably, the metal alkoxide is alkaline metal alkoxide, alkaline earth metal alkoxide or aluminum alkoxide, and the mixing mole ratio of the metal alkoxide and the aromatic hydrocarbon is 1:2 or more. Here, if the mixing mole ratio of the metal alkoxide and aromatic hydrocarbon is less than 1:2, a precipitate is formed from the metal oxide.

Hereinafter, a method for preparing a precursor composition for a metal oxide, and a method for forming a metal oxide film from the precursor composition for a metal oxide according to the present invention will be described.

First, organic substance having an aromatic ring, that is, aromatic hydrocarbon, is dissolved in a first solvent, metal alkoxide is added to the mixture, and then mixed sufficiently. Here, the first solvent is carbon tetrachloride ($CCl_4$), chloroform ($CH_3Cl$) or methanol ($CH_3OH$).

Then, a second solvent is added to the mixture. If required, alkaline metal alkoxide is further added to the mixture. Here, when alkaline metal alkoxide is added to the mixture, the electron density of the metal oxide as the end product is increased, so that it is liable to generate secondary electrons through ion collision. As a result, the possibility of low-voltage driving increases. Here, the content of the alkaline metal alkoxide is preferably 0.01~10 mol % based on the content of the metal alkoxide. Here, if the content of the alkaline metal alkoxide is less than 0.01 mol %, a doping effect of the metal is trivial. On the contrary, if the content of the alkaline metal alkoxide exceeds 10 mol %, the secondary electron is generated in the surface of the metal oxide than the inside of the metal oxide. Then, the first solvent is removed from the reaction mixture, and the resultant is hydrated by adding water, thereby resulting in a precursor composition for a metal oxide. Here, the second solvent for printing is diethyleneglycol mono-n-butyletheracetate (BCA) or diethyleneglycol ethyletheracetate.

Then, if required, a binder is further added to the precursor composition for a metal oxide. Here, the content of the binder is determined to be at an appropriate level in consideration of the used water content and viscosity of the composition.

The obtained precursor composition for a metal oxide is prepared as a paste, and a metal oxide film is formed by a printing method using the precursor composition paste. Here, the thickness of the metal oxide film depends on the contents of metal alkoxide and aromatic hydrocarbon.

The metal oxide film obtained through the above steps can be used as a protective film for a display device, particularly, a plasma display device.

As described above, as the metal alkoxide of the present invention, alkaline metal alkoxide, alkaline earth metal alkoxide, aluminum alkoxide or mixtures thereof is used. Here, by varying the mixing ratio of metal alkoxides, a composite metal oxide having an intended composition can be obtained.

When forming a composite oxide film using the mixture of alkaline earth metal alkoxide and alkaline metal alkoxide as a metal alkoxide, it is difficult to obtain a composite oxide film having even composition by a vacuum deposition or sol-gel process. Meanwhile, in the present invention, by simply mixing alkaline earth metal alkoxide with alkaline metal alkoxide and aromatic hydrocarbon, a composite oxide film having even composition can be obtained.

Hereinafter, the present invention will be described through the following examples. However, the present invention is not limited to the following examples.

EXAMPLE 1

After dissolving 2.56 g of naphthalene in 100 ml of carbon tetrachloride ($CCl_4$), 14 ml of magnesium methoxide ($Mg(OMe)_2$) (Aldrich Co., 7.4 wt % in methanol) was added to the solution, and mixed sufficiently.

After adding 50 ml of BCA to the mixture, the mixture was distilled under vacuum conditions. 3 ml of water was added to the resultant, and mixed sufficiently, and then 4 g of polyethylacetate (Aldrich Co., 300 cps) was added to the mixture. Then, in order to improve printing characteristics, 20 ml of terpineol was added, resulting in a pasty composition for forming a magnesium oxide (MgO) film. Then, a MgO film was formed by a printing method using the composition.

EXAMPLE 2

A MgO film was formed by the same method as described in Example 1, except that 3.6 g of stilbene was used instead of 2.56 g of naphthalene.

EXAMPLE 3

A MgO film was formed by the same method as described in Example 1, except that 1.56 g of xylene was used instead of 2.56 g of naphthalene.

EXAMPLE 4

A MgO film was formed by the same method as described in Example 1, except that 2.46 g of trimethylbenzene was used instead of 2.56 g naphthalene.

EXAMPLE 5

A barium oxide (BaO) film was formed by the same method as described in Example 1, except that 2.55 g of barium isopropoxide ($Ba[OCH(CH_3)_2]_2$) was used instead of 14 ml of magnesium methoxide.

EXAMPLE 6

An aluminum oxide ($Al_2O_3$) film was formed by the same method as described in Example 6, except that 2.04 g of aluminum isopropoxide ($Al[OCH(CH_3)_2]_3$) was used instead of 14 ml of magnesium methoxide.

EXAMPLE 7

After dissolving 2.56 g of naphthalene in 100 ml of carbon tetrachloride ($CCl_4$), 7 ml of magnesium methoxide ($Mg(OMe)_2$) (Aldrich Co., 7.4 wt % in methanol) was added to the solution, and mixed sufficiently.

After adding 1.28 g of barium isopropoxide ($Ba[OCH(CH_3)_2]_2$) to the mixture, the mixture was mixed sufficiently. Then, 50 ml of BCA was added to the mixture and mixed, and the resultant was distilled under vacuum conditions. 3 ml of water was added to the resultant, and mixed sufficiently, and then 4 g of polyethylacetate (Aldrich Co., 300 cps) was added to the mixture. Then, in order to improve printing characteristics, 20 ml of terpineol was added, resulting in a pasty composition for forming a magnesium barium oxide ($MgBaO_2$) film. Then, a $MgBaO_2$ film was formed of the composition by a printing method using the composition.

EXAMPLE 8

A $MgBaO_2$ film was formed by the same method as described in Example 7, except that 3.6 g of stilbene was used instead of 2.56 g of naphthalene.

EXAMPLE 9

A $MgBaO_2$ film was formed by the same method as described in Example 7, except that 1.56 g of xylene was used instead of 2.56 g of naphthalene.

EXAMPLE 10

A $MgBaO_2$ film was formed by the same method as described in Example 7, except that 2.46 g of trimethylbenzene was used instead of 2.56 g naphthalene.

EXAMPLE 11

A barium oxide (BaO)-aluminum oxide ($Al_2O_3$) composite film was formed by the same method as described in Example 7, except that 1.28 g of barium isopropoxide (Ba[OCH($CH_3$)$_2$]$_2$) instead of 7 ml of magnesium methoxide, and 1.02 g of aluminum isopropoxide (Al[OCH($CH_3$)$_2$]$_3$) instead of 1.28 g of barium isopropoxide (Ba[OCH($CH_3$)$_2$]$_2$) were used.

EXAMPLE 12

A magnesium oxide (MgO)-aluminum oxide ($Al_2O_3$) composite film was formed by the same method as described in Example 7, except that 1.02g of aluminum isopropoxide (Al[OCH($CH_3$)$_2$]$_2$) was used instead of 1.28 g of barium isopropoxide (Ba[OCH($CH_3$)$_2$]$_2$).

EXAMPLE 13

After dissolving 2.56 g of naphthalene in 100 ml of carbon tetrachloride ($CCl_4$), 12 ml of magnesium methoxide (Mg(OMe)$_2$) (Aldrich Co., 7.4 wt % in methanol) was added to the solution, and mixed sufficiently.

After adding 50 ml of BCA to the mixture, the mixture was mixed. Then, 0.1 ml of lithium tert-butoxide (Aldrich Co., 1.0 M in hexane) was added to the mixture and mixed sufficiently, and the resultant was distilled under vacuum conditions. 3 ml of water was added to the resultant, and mixed sufficiently, and then 4 g of polyethylacetate (Aldrich Co., 300 cps) was added to the mixture. Then, in order to improve printing characteristics, 20 ml of terpineol was added, resulting in a pasty composition for forming a composite oxide film containing magnesium (Mg) and lithium (Li). Then, a Mg-Li-O composite film was formed by a printing method using the composition.

EXAMPLE 14

A Ba-Li-O composite film was formed by the same method as described in Example 13, except that barium methoxide was used instead of magnesium methoxide.

EXAMPLE 15

A Mg-K-O composite film was formed by the same method as described in Example 13, except that 0.1 ml of potassium tert-butoxide (Aldrich, 1.0 M in isopropanol) was used instead of 0.1 ml of lithium tert-butoxide (Aldrich, 1.0 M in hexane).

EXAMPLE 16

A Ba-K-O composite film was formed by the same method as described in Example 15, except that barium methoxide was used instead of magnesium methoxide.

EXAMPLE 17

A Mg-Na-O composite film was formed by the same method as in Example 13, except that 0.037 ml of sodium ethoxide (Aldrich Co., 21 wt % in ethanol) was used instead of 0.1 ml of lithium tert-butoxide (Aldrich Co., 1.0 M in hexane).

The precursor compositions for a metal oxide film, prepared in Examples 1 through 6, exhibited excellent stability to heat and moisture in the air. Also, the precursor compositions prepared in Examples 7 through 17 exhibited excellent stability to heat and moisture in air, and composite films in which two metals have been mixed could be formed from the compositions.

The metal oxide films prepared in Examples 1 through 17 have excellent film quality and physical properties such as transmittance, and easily generate secondary electrons in a low discharging voltage. Thus, the metal oxide film can be useful as an protective film for a plasma display device.

The precursor composition for forming a metal oxide according to the present invention exhibits excellent stability to heat and moisture in the air, and is easily mixed with various organic solvents and binders, and easily prepared in paste form. Also, various metals are evenly mixed in the paste, so the precursor composition is very useful in forming a composite metal oxide film. In the case where the composite metal oxide film is used as a protective film for a display device, particularly, for a plasma display device, the composite metal oxide film can easily generate secondary electrons even at a low discharging voltage.

In addition, the precursor composition for a metal oxide according to the present invention can be used as an inorganic binder or for preparing a catalyst.

What is claimed is:

1. A precursor composition for a metal oxide comprising metal alkoxide and aromatic hydrocarbon, wherein the metal alkoxide is selected from the group consisting of magnesium methoxide, barium methoxide, barium isopropoxide, aluminum isopropoxide, potassium tert-butoxide, lithium tert-butoxide and sodium ethoxide.

2. A precursor composition for a metal oxide comprising metal alkoxide and aromatic hydrocarbon, wherein the aromatic hydrocarbon is at least one selected from the group consisting of naphthalene, stilbene and trimethylbenzene, and the metal alkoxide is at least one selected from the group consisting of alkaline metal alkoxide, alkaline earth metal alkoxide and aluminum alkoxide.

3. The precursor composition of claim 1, wherein the mixing mole ratio of the metal alkoxide and the aromatic hydrocarbon is 1:2 or more.

4. The precursor composition of claim 1, further comprising a binder.

5. A precursor composition for a metal oxide comprising metal alkoxide and aromatic hydrocarbon, further comprising a binder, wherein the binder is at least one selected from the group consisting of polyethylcellulose and polyvinylacetate.

6. A method for preparing a precursor composition for a metal oxide, comprising the steps of:
   (a) dissolving aromatic hydrocarbon in a first solvent and adding metal alkoxide to the solution;
   (b) adding a second solvent to the mixture of step (a); and
   (c) removing the first solvent from the mixture of step (b) and adding water to the mixture.

7. The method of claim 6, wherein the aromatic hydrocarbon is at least one selected from the group consisting of naphthalene, stilbene and trimethylbenzene, and the metal alkoxide is at least one selected from the group consisting of alkaline metal alkoxide, alkaline earth metal alkoxide and aluminum alkoxide.

8. The method of claim 6, wherein the first solvent is at least one selected from the group consisting of carbon tetrachloride ($CCl_4$), chloroform ($CH_3Cl$) and methanol ($CH_3OH$), and the second solvent is at least one selected from the group consisting of diethyleneglycol mono-n-butyletheracetate (BCA) and diethyleneglycol ethyletheracetate.

9. The method of claim 6, wherein the mixing mole ratio of the metal alkoxide and the aromatic hydrocarbon is 1:2 or more.

10. The method of claim 6, further comprising a step of adding alkaline metal alkoxide after the step (b) of adding the second solvent to the mixture obtained in the step (a).

11. The method of claim 10, wherein the content of alkaline metal alkoxide is 0.01~10 mol % based on the content of the metal alkoxide of the step (a).

12. The method of claim 6, further comprising a step of adding a binder after step (c).

13. The method of claim 12, wherein the binder is at least one selected from the group consisting of polyethylcellulose and polyvinylacetate.

14. The precursor composition of claim 2, wherein the mixing mole ratio of the metal alkoxide and the aromatic hydrocarbon is 1:2 of more.

15. The precursor composition of claim 2 further comprising a binder.

16. The precursor composition of claim 3 further comprising a binder.

17. The method of claim 7, further comprising a step of adding a binder after step (c).

18. The method of claim 8, further comprising a step of adding a binder after step (c).

19. The method of claim 9, further comprising a step of adding a binder after step (c).

20. The method of claim 10, further comprising a step of adding a binder after step (c).

21. The method of claim 11, further comprising a step of adding a binder after step (c).

22. The method of claim 6, wherein the metal alkoxide is selected from the group consisting of magnesium methoxide, barium methoxide, barium isopropoxide, aluminum isopropoxide, potassium tert-butoxide, lithium tert-butoxide and sodium ethoxide.

* * * * *